US005233359A

United States Patent [19]

Panaretos

[11] Patent Number: 5,233,359

[45] Date of Patent: Aug. 3, 1993

[54] LOW DIFFERENCE PATTERN SIDELOBE PATTERN CIRCUIT

[75] Inventor: Steve K. Panaretos, Los Angeles, Calif.

[73] Assignee: Hughes Aircraft Company, Los Angeles, Calif.

[21] Appl. No.: 864,985

[22] Filed: Apr. 7, 1992

[51] Int. Cl.[5] .......................... G01S 3/16; G01S 13/00

[52] U.S. Cl. ..................................... 342/379; 342/153

[58] Field of Search ............... 342/379, 381, 153, 380; 333/117

[56] References Cited

U.S. PATENT DOCUMENTS 3,803,624 4/1974 Kinsey ................................ 342/380

*Primary Examiner*—Gregory C. Issing

*Attorney, Agent, or Firm*—L. A. Alkov; W. K. Denson-Low

[57] ABSTRACT

An antenna distribution network for an antenna array which provides independent sum and difference aperture excitations and enables a reduction in the difference channel radiation sidelobe levels. The circuit operates to smooth out the step discontinuity in the complex signal excitation of the radiating aperture in the difference mode by reducing considerably the amplitude of at least two corresponding elements located on opposite sides of the array center. A circuit of four four-port hybrid devices is employed, and introduces no effect when in the sum mode.

5 Claims, 6 Drawing Sheets

LOW DIFFERENCE PATTERN SIDELOBE PATTERN CIRCUIT

BACKGROUND OF THE INVENTION

This invention relates to a circuit configuration that, when implemented into an antenna power distribution network, provides independent sum and difference aperture excitations. This enables a reduction in the difference channel radiation pattern sidelobe levels with insignificant degradation on the sum channel radiation pattern.

In general, there are two types of constrained feed networks for antenna array systems: traveling wave and corporate feeds. They are distinguished by the method by which they distribute RF energy. In a travelling wave type, RF energy is inputted into a main transmission line and as it traverses the length of this line, small amounts are coupled off into the output ports of the feed. The path lengths from the input point to every feed output port are different. In contrast, in a corporate feed the inputted RF energy is continuously divided into smaller amounts eventually reaching the output ports. In this case, the path lengths from the feed input point to every output port are identical. A travelling wave feed can be designed to have equal path lengths from the feed input point to each output port, but this approach adds hardware complexity.

Conventional power distribution networks for antenna arrays provide control only of the sum channel radiation pattern sidelobes. Low sidelobe sum pattern designs invariably exhibit difference patterns with poor (high) or indiscernible sidelobe structure.

Several power distribution network schemes have heretofore been developed that allow independent control of the aperture excitation by the sum and difference channels. Most of these schemes are very complex and difficult to implement into hardware. In addition, networks that provide independent sum and differences channel aperture excitation are constrained to "series" or traveling wave types of circuits. This restriction makes such networks attractive to only narrow instantaneous bandwidth applications. These "traveling wave" feed configurations and the conventional independent aperture control scheme can be converted to "parallel" or "equal path length" structures with wide instantaneous bandwidth characteristics. However, this conversion is very unattractive for large array systems because of packaging complexity, weight and cost.

It would therefore represent an advance in the art to provide an independent aperture excitation network which is applicable to both parallel and series feeding structures and is simple in its hardware implementation.

It would further be advantageous to provide a relatively low cost and simple (in hardware) approach to the reduction of difference pattern sidelobes without any impact on the sum pattern sidelobes.

SUMMARY OF THE INVENTION

In accordance with the invention, a monopulse antenna system is provided which is characterized by reduced sidelobe levels in the difference mode. The system comprises an array of radiating elements disposed symmetrically about an array centerline.

The system further includes a means operable only in the difference mode for driving the radiating elements located on one side of the centerline with signals which are out-of-phase with the signals driving the radiating elements located on the other side of the centerline. To reduce the sidelobe level when in the difference mode, the system further includes a means for substantially reducing the amplitude of the signals driving a pair of radiating elements symmetrically located about the centerline. As a result, the step discontinuity in the complex signal excitation of the radiating aperture of the array is smoothed, thereby causing a reduction of sidelobe levels when the array is operated in the difference mode.

The invention is further characterized by a method for reducing sidelobe levels in the difference mode of a monopulse antenna system which includes an array of radiating elements disposed symmetrically about an array centerline. The method comprises the following steps:

- in the difference mode, driving the radiating elements located on one side of the centerline with signals which are out-of-phase with signals driving the radiating elements located on the other side of the centerline; and
- for a pair of radiating elements symmetrically located about the centerline, substantially reducing the amplitude of the signals driving the pair of radiating elements.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
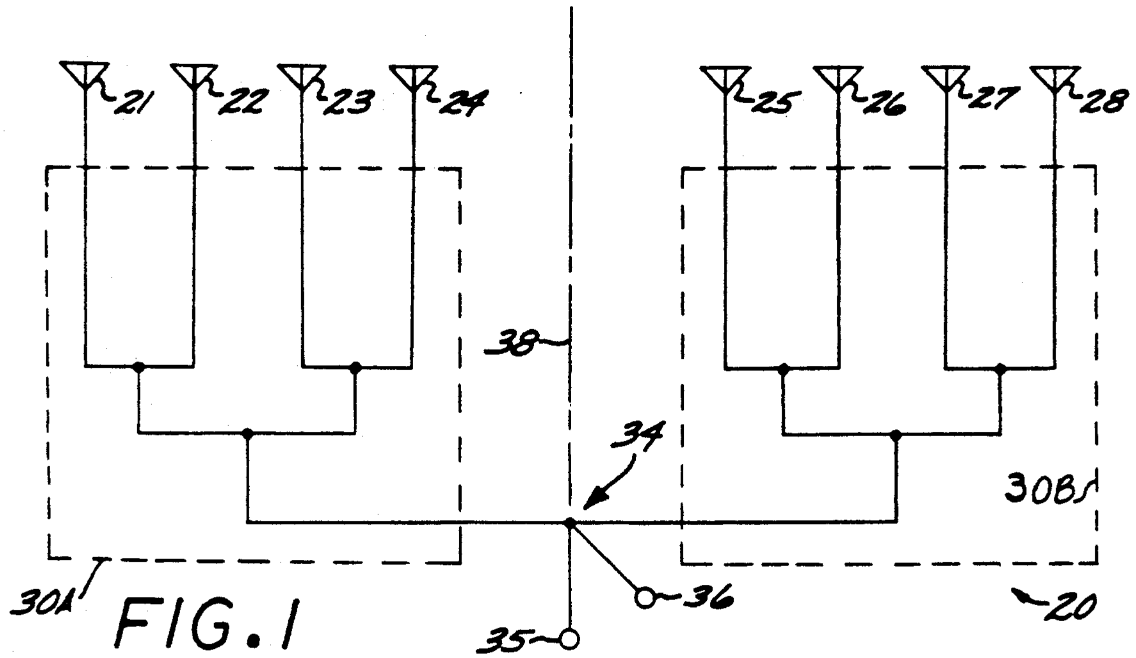
FIG. 1 is a schematic diagram of a conventional linear array of radiators, with a corporate power distribution network, fed by a monopulse network at its input.

FIG. 1 shows a schematic circuit representation of an array system 20 comprising a conventional linear array of radiators 21–28. The array system has a corporate or parallel type of power distribution network comprising networks 30A and 30B, fed through a monopulse network 34 at the input. The monopulse network 34 consists of a magic T, and is characterized by a sum port 35 and a difference port 36.

When an RF signal is applied at the sum channel input 35, the radiating elements 21–28 are excited in phase, and with the proper amplitude distribution as provided by the feed network 30. When an RF signal is applied to the difference channel port 36, the same amplitude excitation is obtained at the radiating elements 21–28 as in the sum channel case. However, the resulting radiating element phase excitation has a step discontinuity at the center axis 38 of the array 20. Half the radiating elements of the array are 180° out-of-phase in reference to the other half of the array, i.e., the radiating elements 21-24 are 180° out-of-phase with the radiating elements 25-28. This step discontinuity, in the radiating element complex signal excitation (amplitude, phase), results in a difference far field radiation pattern with very high sidelobes. In fact, in cases of strong amplitude tapering to reduce the sum radiation pattern sidelobes, the resulting difference pattern has no clearly discernible sidelobe structure.

It is highly desirable to design antennas that provide radiation patterns with low sidelobes in both the sum and difference channels. A method to lower the difference channel sidelobes in accordance with the invention is to "smooth" out the step discontinuity in the complex signal excitation of the radiating aperture. This method is quite effective even when applied to as few as two radiating elements near the center of the array. It requires that the amplitude of pairs of elements, symmetrically located about the center of the array, be reduced considerably or even driven to zero.

Figure 2:
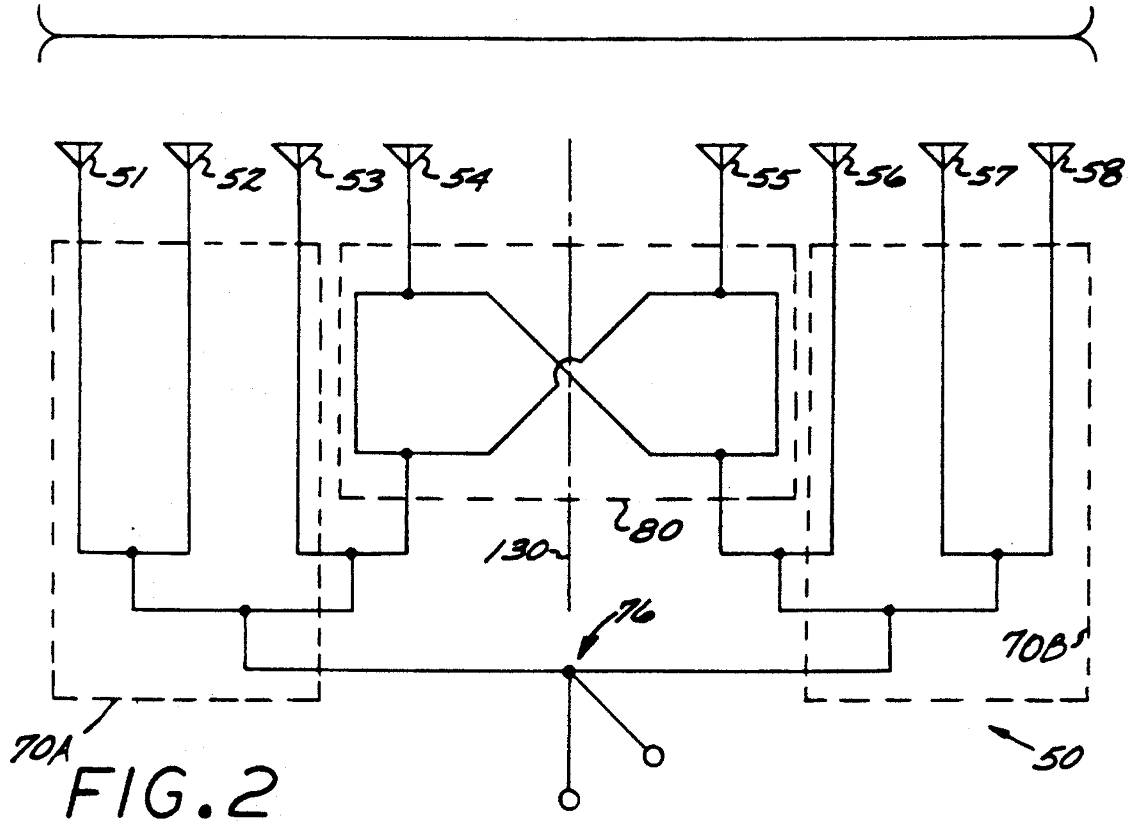
FIG. 2 is a schematic diagram of a linear array system employing the present invention.

An exemplary circuit configuration that provides reduced difference pattern sidelobes in accordance with the invention is presented in FIG. 2. The implementation shown involves only one pair of elements symmetrically located about the center of the array. The concept can be extended equally well to more pairs of elements.

The array system 50 of FIG. 2 comprises a linear array of radiators 51-58, of which the radiator pair 54 and 55 are excited by a novel circuit 80 in accordance with the invention. As in the system of FIG. the system 50 comprises a corporate feed comprising networks 70A and 70B whose inputs are fed by a monopulse circuit 76. The feed networks 70A and 70B and circuit 76 are identical to the feed networks 30A and 30B and circuit 34 of the system 20 of FIG. 1.

Figure 3:
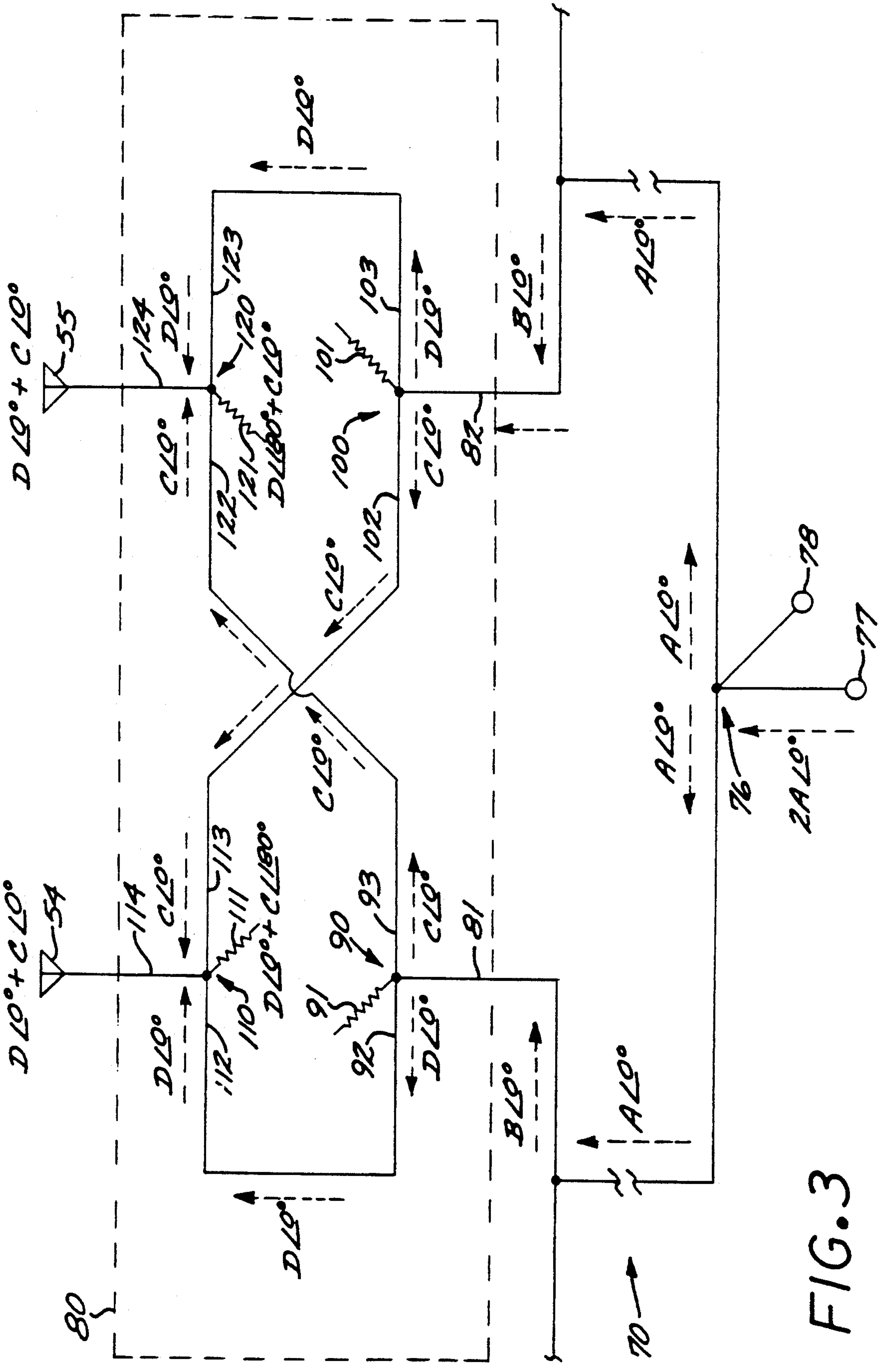
FIGS. 3 and 4 illustrate the hybrid divider circuit comprising the array system of FIG. 2, and the signal flow therethrough for the cases when the sum and difference ports of the array are excited respectively.

The circuit 80 of FIG. 2 is shown in detail in FIG. 3 and comprises four, four-port microwave hybrid power dividers, e.g., magic T devices, Wilkinson power dividers, or other known types of four-port hybrid devices. The invention takes advantage of the directive properties of these four-port hybrid devices The four hybrids 90, 100, 110 and 120 are of identical power split design. Power from the networks 70A and 70B enters the circuit 80 at the respective input ports at input ports 81 and 82. In the sum mode, the RF energy at the ports 81 and 82 will be in phase; in the difference mode, the energy at these ports will be 180° out-of-phase. The power at port 81 enters the hybrid device 90, and is split into two signal components at ports 92 and 93. The signal components are in-phase and of amplitude C and D determined by the power split ratio of the hybrid 90. Similarly the power at port 82 enters the hybrid device 100, where it is split into two in-phase signal components at ports 102 and 10 of amplitude C and D.

Port 92 of hybrid 90 is connected to port 112 of hybrid 110. Port 93 of hybrid 90 is connected to port 122 of hybrid 120. Port 102 of hybrid 100 is connected to port 113 of hybrid 110. Port 103 of hybrid 100 is connected to port 123 of hybrid 120.

Hybrid 110 combines the signals at ports 112 and 113 into a sum signal at port 114 which drives the radiating element 54. Similarly, hybrid 120 combines the signals at ports 122 and 123 into a sum signal at port 124 which drives radiating element 55.

The power ratio provided by the design of the hybrids determines the power delivered to the radiating elements 54 and 55 and the amount of power that is delivered to and absorbed by the matched loads 91, 101, 111 and 121 connected to the isolated ports of the hybrid power dividers. In the difference mode of operation, equal power split results in no power into the radiating elements; all the power is delivered to the isolated port loads. Similarly, in the difference mode, high power split unbalance results in most of the power being delivered to the radiating elements 54 and 55 and the rest is directed to the hybrid loads.

Figure 4:
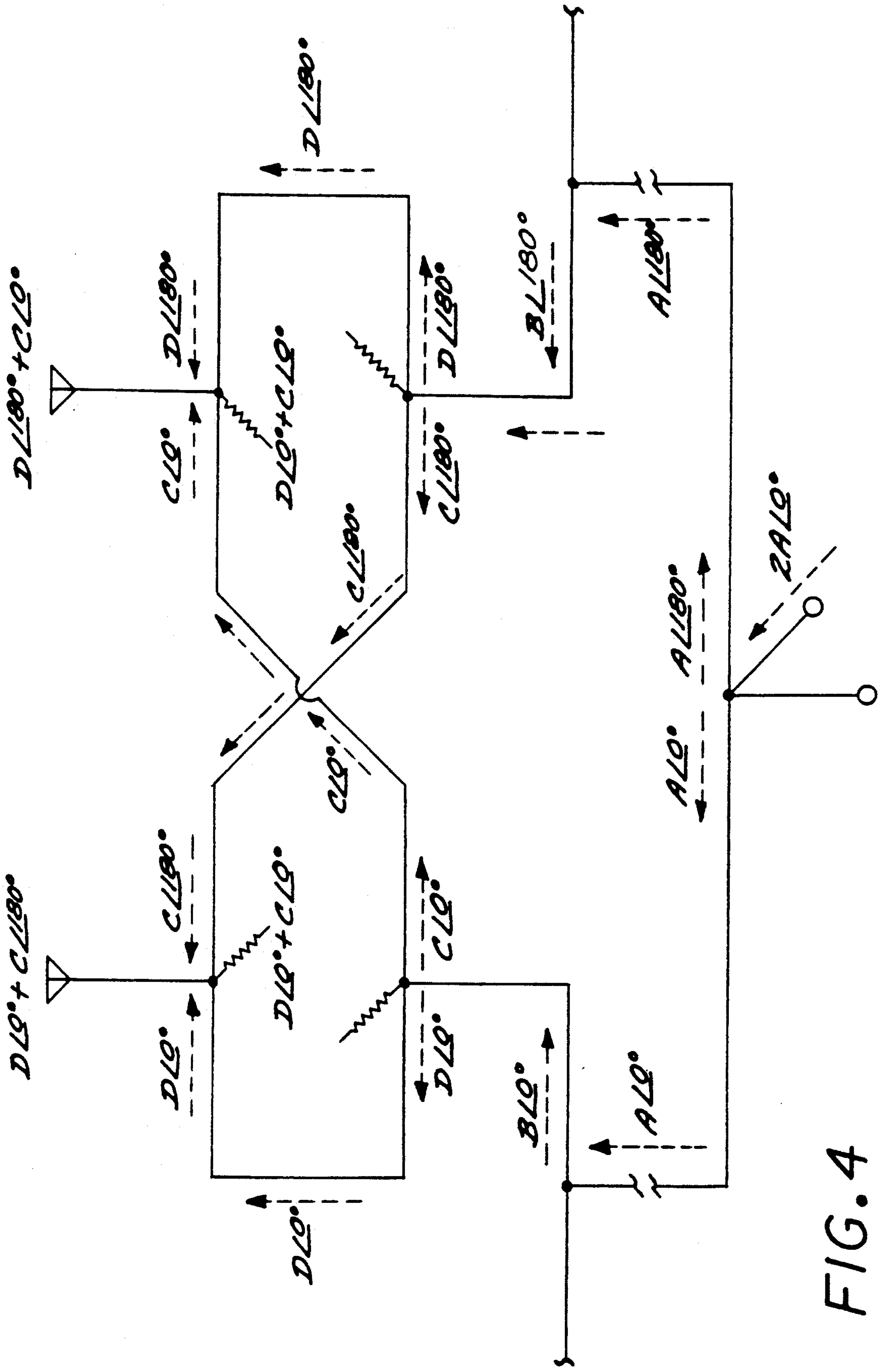

The circuit 80 operates along the following principles, with FIGS. 3 and 4 illustrating the signal flow through the circuit 80 when the sum and difference ports are excited, respectively. When RF energy is fed into the sum port 77 of the monopulse circuit 76 of the array 50, identical RF circuit locations, with respect to the center of the array, anywhere along the array RF circuit are in phase relative to each other. Therefore, when RF energy reaches the hybrids 90, 100, 110 and 120 of circuit 80, and is initially divided and then recombined, there is no power loss into the isolated ports of the hybrids 90, 100, 110 and 120. Thus, when the sum port 77 of the array 50 is excited, the resulting amplitude and phase aperture distribution is not affected at all by the introduction of the circuit 80 between the feed network 70 and the array elements 54 and 55. It remains the same as provided by the feed networks 70A and 70B.

When RF energy is inputted into the difference port 78 of the linear array of FIG. 2, identical RF circuit points, with respect to opposite sides of the center 130 of the array anywhere along the array RF circuit, are 180° out-of-phase relative to each other. Therefore, when RF energy reaches the circuit 80 and is divided by the power dividers 90, 100, 110 and 120, the recombined signals are 180° out-of-phase, and all or part of the energy will be absorbed by the matched loads 111 and 121 of the isolated ports of the recombining hybrids 110 and 121. The portion of the input power that is absorbed by the hybrid loads 111 and 121 and the percentage of input power that is radiated depends on the power split design of devices 90, 100, 110 and 120. Thus, when the difference port 78 of the array 50 is excited, the resulting amplitude excitation of the elements 54 and 55 connected to the circuit 80 is reduced or driven to zero. The resulting difference pattern has lower difference sidelobes without any effect on the sum pattern sidelobes. In other words, the introduction of the circuit 80 of this invention enables independent control of the sum and difference aperture excitations. Since reciprocity applies, the described circuit function is identical as the array operates on a receive mode.

Figure 5:
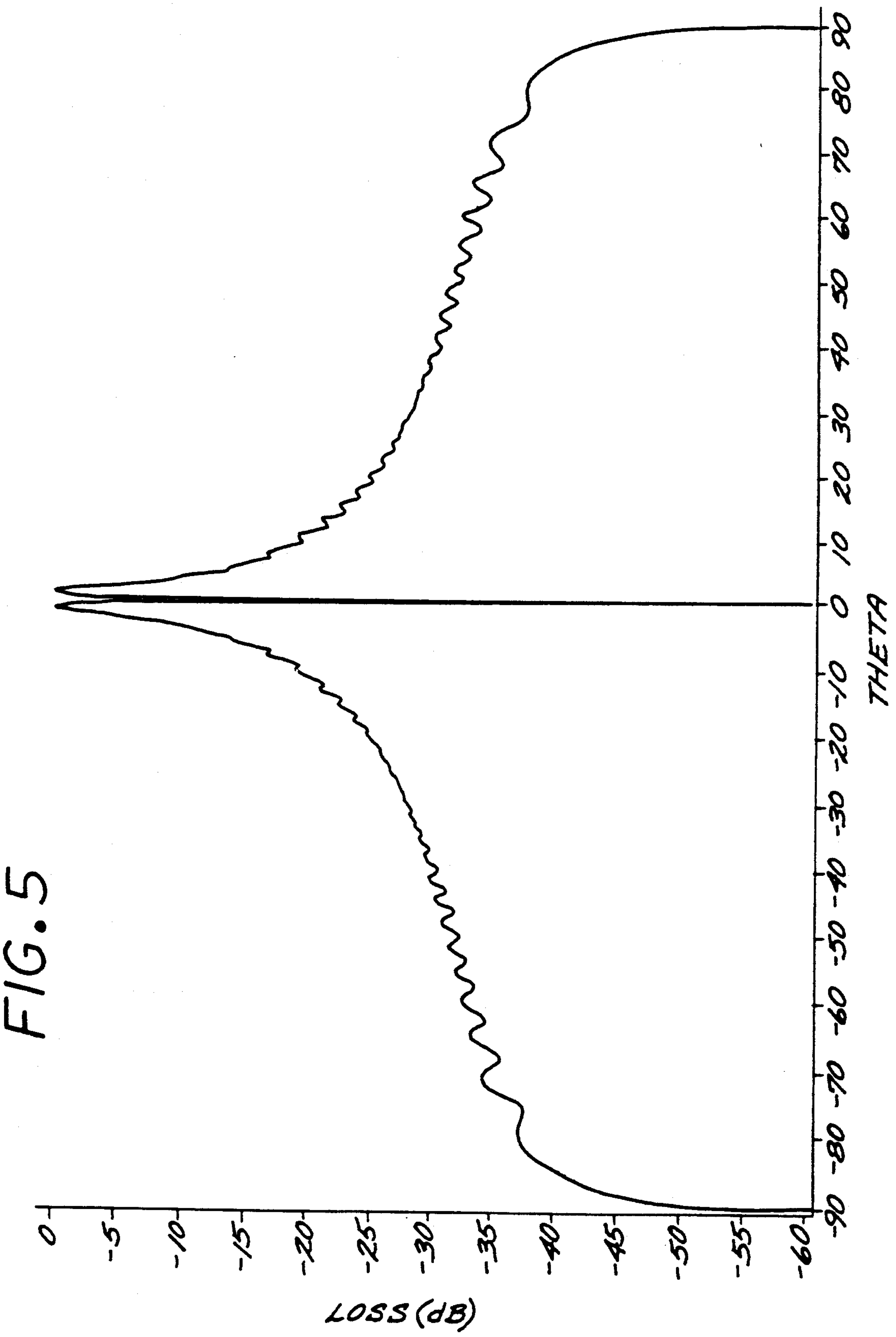
FIG. 5 represents the computed difference pattern of a conventional 94 element linear array.
Figure 6:
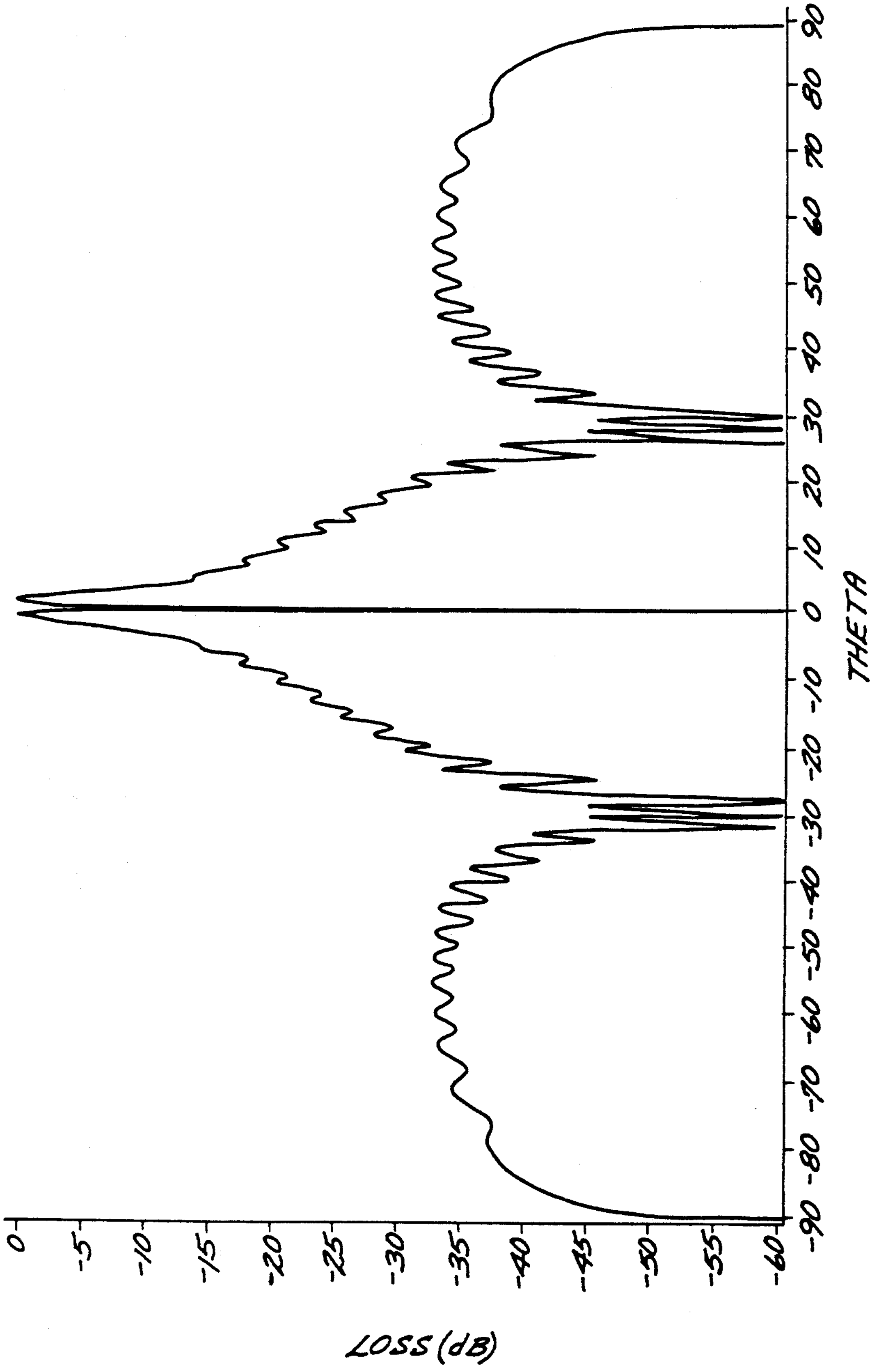
FIGS. 6 and 7 present the impact on the difference pattern of an array as in FIG. 5, when the invention is employed to drive the RF levels at two elements symmetrically located about the center of the array to zero and to a quarter of the sum excitation, respectively.
Figure 7:
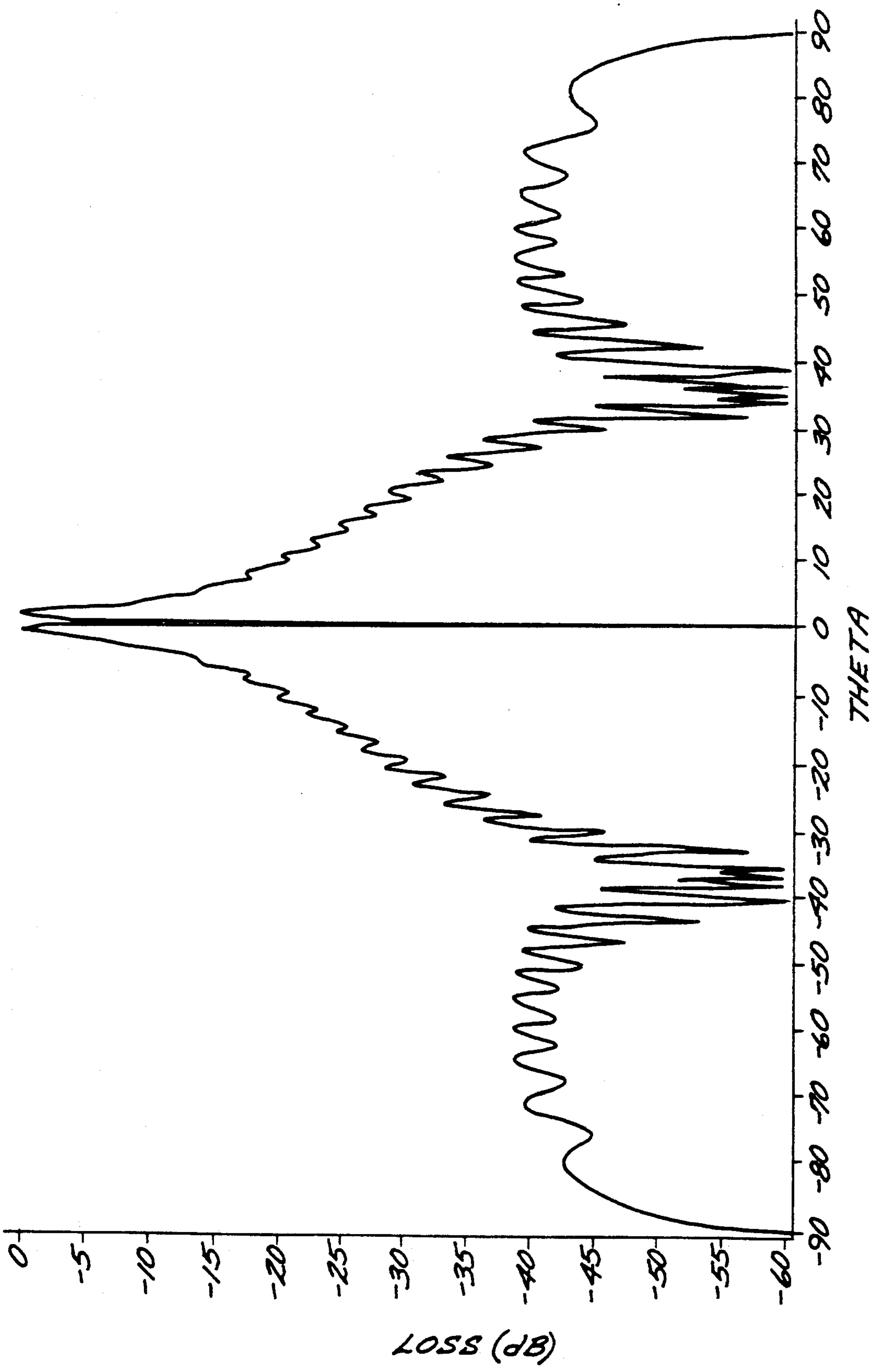

FIGS. 5, 6 and 7 present computed difference patterns of exemplary 94 element linear arrays. FIG. 5 shows the difference pattern of a conventional array. FIG. 6 presents the impact on the difference pattern when the invented circuit is introduced in the array feed. In this case two elements symmetrically located about the center of the array are driven to zero. It is apparent that there is a drop (improvement) in the average sidelobe level. FIG. 7 illustrates the impact on the difference pattern when the same two elements have their amplitudes reduced to a quarter of that of the sum excitation. Again, there is noticeable difference pattern sidelobe improvement.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A monopulse antenna array, comprising:

a plurality of antenna elements disposed about an array centerline;

a feed network for dividing input RF energy among said elements;

a monopulse circuit connecting said input RF energy to the input of said feed network;

said array having the capability of transmitting or receiving in a sum mode wherein the respective antenna elements are driven in phase or the contributions from the respective elements are combined in phase, and of transmitting or receiving in a difference mode wherein the antenna elements disposed on one side of said centerline are driven 180 degrees out of phase with the elements disposed on the other side of the centerline, or the contributions from the elements disposed on one side of the centerline are summed 180 degrees out of phase with the contributions from the elements on the other side of the centerline;

circuit means connected between said feed network and two antenna elements disposed on opposite sides of said centerline in corresponding positions, said circuit means having first and second feed ports connected to respective network feed ports, and first and second radiating element ports connected to respective first and second elements disposed on opposite sides of said centerline and adjacent said centerline, said circuit means further comprising first, second, third and fourth four-port symmetrical coupler circuits, said first and second couplers having a respective port respectively connected to said first and second feed ports, said third and fourth couplers having a respective port respectively connected to said first and second radiating element ports, each of said coupler having one port to which a load is connected, said circuit means operating to divide substantially all the in-phase RF power at said first and second feed ports equally between said first and second element ports, and operates to deliver at least a substantial portion of all out-of-phase RF power at said first and second feed ports to loads connected to said third and fourth couplers, wherein said portion of said out-of-phase RF power is determined by coupling factors of said coupler devices, and said out-of-phase power not delivered to said load is divided equally between said first and second element ports.

2. The array of claim 1 wherein a first port of said first coupler is connected to a first port of said third coupler, a second port of said first coupler is connected to a first port of said fourth coupler, a first port of said second coupler is connected to a second port of said fourth coupler and a second port of said second coupler is connected to a second port of said third coupler.

3. The array of claim 1 wherein said coupler devices are characterized by substantially identical coupling factors.

4. The array of claim 3 wherein said coupler factors provide non-equal power splitting by said coupler devices, wherein a portion of said out-of-phase RF power is delivered to said loads and a portion is delivered to said first and second radiating elements.

5. The array of claim 3 wherein said coupler factors provide equal power splitting by said coupler devices, wherein substantially all of said out-of-phase RF power is delivered to said loads, and virtually non of said out-of-phase power is delivered to said radiating elements.

* * * * *